United States Patent [19]

Jossick

[11] Patent Number: 5,781,846
[45] Date of Patent: Jul. 14, 1998

[54] FLUX CORED BRAZING COMPOSITION

[76] Inventor: James L. Jossick, 18 Chestnut, Exeter, N.H. 03833

[21] Appl. No.: 511,790

[22] Filed: Aug. 7, 1995

Related U.S. Application Data

[63] Continuation-in-part of Ser. No. 22,365, Feb. 25, 1993, abandoned.

[51] Int. Cl.[6] ............................................. B22F 7/04
[52] U.S. Cl. ........................... 419/66; 419/65; 428/560; 29/527.2
[58] Field of Search .................... 428/560; 419/65, 419/66; 29/527.2

[56]  References Cited

U.S. PATENT DOCUMENTS

| | | | |
|---|---|---|---|
| 3,033,977 | 5/1962 | Quaas | 219/146 |
| 3,275,786 | 9/1966 | Cushman | 219/60 |
| 3,466,417 | 9/1969 | Chapman | 219/74 |
| 3,834,002 | 9/1974 | Sissons et al. | 29/420.5 |
| 3,848,109 | 11/1974 | Zuanut | 219/146 |
| 4,122,238 | 10/1978 | Frantzerb, Jr. | 428/558 |
| 4,336,441 | 6/1982 | Godai et al. | 219/137 WM |
| 4,396,820 | 8/1983 | Puschner | 219/121 BD |
| 4,800,131 | 1/1989 | Marshall et al. | 428/558 |
| 4,831,701 | 5/1989 | Yutaka | 29/157.3 R |
| 5,330,090 | 7/1994 | Iwai | 228/56.3 |
| 5,547,517 | 8/1996 | Iwai | 148/24 |

*Primary Examiner*—Daniel J. Jenkins
*Attorney, Agent, or Firm*—William B. Ritchie; Michael J. Persson

[57]  ABSTRACT

A method of producing a flux-cored brazing composition for brazing aluminum that can be produced in lengths ranging from 500 to 10,000 feet long. The flux, preferably a finely powdered potassium fluoroaluminate complex, is deposited in an extremely small channel of aluminum filler material using a volumetric feeder to ensure an even distribution of flux to metal alloy.

11 Claims, 1 Drawing Sheet

FLUX CORED BRAZING COMPOSITION

This application is a continuation in part of U.S. patent application Ser. No. 08/022,365, filed Feb. 25, 1993, now abandoned.

BACKGROUND OF THE INVENTION

1. Field of the Invention

The invention relates to a method of manufacturing and using a brazing composition for use in various aluminum brazing applications.

2. Description of the Related Art

The brazing process typically involves joining aluminum or metal components together by disposing a brazing composition such as an aluminum or metal alloy and flux adjacent to or between the faying surfaces, i.e., the surfaces to be joined. The brazing filler alloy and flux and the faying surfaces are then heated to the brazing temperature, typically above the melting temperature of the braze alloy but below the melting temperature of the components to be joined. The brazing composition then melts, flows into the joint by capillary action and forms a fillet and seal that bonds the faying surfaces. Usually, the brazing alloy has a melting point that is about 30° C. to 40° C. lower than that of the faying surfaces. An example of a suitable aluminum brazing alloy is an aluminum-silicon (Al—Si) eutectic composition, which typically has a melting point at about 577° C.

It is often necessary to apply a flux composition to the faying surfaces prior to brazing. The application of flux to the surfaces to be brazed helps to remove any oxides ordinarily present on the exposed metal surfaces, helps to promote the flow of the molten brazing alloy during brazing, and inhibits further oxide formation on the surfaces. Thus, the flux material must be capable of removing metal oxides at preselected brazing temperatures while remaining substantially inert with respect to the brazing alloy. Since fluxes are usually reactive, e.g., capable of removing oxides, the flux should be transformed to its molten state at or near the melting temperature of the brazing alloy.

Chloride fluxes have been used in the past to braze aluminum assemblies. However, chloride fluxes are known to be hygroscopic and corrosive and to leave a hygroscopic, corrosive residue on the external surfaces of the faying assemblies. The chloride fluxed assemblies must be brazed soon after applying the flux to prevent corrosion of the aluminum and deterioration of the flux. After brazing, this flux residue must be removed to enhance the assembly's anti-corrosion properties. The removal of the residue is difficult and expensive since the assemblies require extensive post brazing washing and treatment to obtain the required corrosion resistance. Moreover, disposal of the post brazing washing compound presents a problem since it contains contaminants from the chloride fluxing compound.

Non-corrosive, non-hygroscopic flux materials have recently been developed and used. Such fluxes are formed from a mixture of potassium fluoro aluminate complexes (typically $kAl_4$ and $K_3lF_6$) and are sold by Solvay Performance Chemicals under the trademark NOCOLOK.

Various techniques are used to apply flux to the joint area and to the external portion of the faying surfaces. Usually, the flux is applied to the surfaces to be brazed and the surfaces are heated to allow the flux to melt, flow and coat the metal surfaces. The application of flux by such techniques is costly and time consuming as the flux must be removed from areas where it is not desired and because flux application and brazing must be performed in separate steps. Where non-corrosive fluxes, such as potassium fluoro aluminate complexes, are applied by such techniques it is particularly difficult to remove excess flux because these fluxes leave a residue that is substantially insoluble in water.

There exists some welding wire compositions that combine a flux with a welding filler alloy. U.S. Pat. No. 4,800,131 discloses a cored wire filler metal comprising an outer metal sheath that encloses a wire core, and a method of manufacturing such an assembly. This patent further discloses that the core wire can utilize an iron-wire core having a packed ferrous powder filler as a center. The center may also include other components such as admixtures of nickel, chromium and zinc. All examples, disclosures and teachings of 4,800,131 relate to welding of ferrous alloys.

U.S. Pat. No. 4,831,701 discloses a non-corrosive flux particulate coated with zinc or a zinc alloy, such as an aluminum zinc alloy. The coating is predisposed on the flux particulate by vacuum vapor deposition or ion plating. The coated flux particles can then be applied to a faying surface by spray coating. Although somewhat useful, such a composition does not provide for the ability to apply the flux particulate to precise locations without any associated flow of molten flux and brazing alloy that adheres to the faying surfaces in places where flux is not desired. This composition does not provide for the braze filler metal necessary to join the faying surfaces.

The use of non-corrosive fluxes such as NOCOLOK solve many of the problems associated with brazing aluminum. However, attempts at using such fluxes so that it can be applied to precise locations in the proper proportions have failed due to the inability of producing a flux cored product in anything other than very short lengths. Short lengths, while workable, having no commercial value since only long lengths of a flux cored product can be made into the variety of sizes needed to meet industrial needs.

Despite known brazing compositions and methods, there still exists a need for a fluxed cored brazing composition suitable for brazing aluminum that can be produced in continuous lengths from at least 500 feet to more than 10,000 feet long; is easily applied to various faying surfaces, is simple to handle, minimizes flux usage and flow and precisely controls the amount of filler metal and flux at each joint.

SUMMARY OF THE INVENTION

It is an object of the invention to provide a method of preparing a flux-cored brazing composition that is easily utilized and able to conform to the contours of most faying surfaces.

It is still another object of the invention to provide a method of preparing a flux-cored brazing composition that is easily formed to a desired shape, such as ring, disc or ribbon.

Still another object of the invention is to provide a method of preparing a flux-cored brazing composition having a non-corrosive, non-hygroscopic flux disposed within a brazing alloy sheath.

Still another objective is to provide a method of preparing a flux-cored brazing composition that eliminates the use of organic materials to bind the flux to the braze filler metal alloy.

Yet another object of the invention is to provide a method of preparing a flux-cored brazing composition that mounts easily to surfaces to be brazed and leaves no excess flux by minimizing the amount of run-off experienced.

Finally, it is an objection of the invention to provide a method of preparing a flux-cored brazing composition that can be made in lengths ranging from 500 feet to more than 10,000 feet of continuous lengths. Other general and more specific objects of this invention will be apparent from the description and drawings which follow.

These and other objects are attained by the invention which provides, in one aspect, a brazing composition having an outer sheath or shell composed of an aluminum-silicon (Al—Si) alloy that encases a core of solid non-corrosive flux. The brazing alloy typically has a melting temperature in the range of 577°–613° C. The flux material typically is an eutectic mixture of $K_3IF_6$ and $KAl_4$ that has a melting range between approximately 562° C. and 577° C. The flux material employed preferably is non-hygroscopic and non-corrosive. Because the flux and brazing alloy melt at approximately the same temperature range, there is little or no uncontrolled flow of flux to undesired areas of the surfaces to be brazed.

The flux-cored composition is produced by carefully feeding the finely powdered flux via a volumetric feeder to a strip of aluminum filler material that has been formed to provide a channel, then rolling the strip to form an elongate sheath having a length of at least five hundred feet long.

The flux core of the brazing component may also be a fluoride and/or chloride salt-containing corrosive flux that is disposed within a non-hygroscopic organic vehicle, such as acrylic, polybutene or a wax. Such a composition has properties somewhat similar to a non-corrosive, non-hygroscopic flux as the vehicle prevents absorption of water vapor from the atmosphere and corrosion of the Al—Si sheath by the flux. Such a composition also prevents deterioration of flux activity, thus increasing the shelf life of the product. Another advantage of such a composition is that it utilizes a premeasured volume of corrosive component and use of the flux is kept to a minimum. Although the vehicle helps such a flux composition achieve properties similar to a non-corrosive, non-hygroscopic flux the non-corrosive, non-hygroscopic flux has inherently greater environmental stability.

DETAILED DESCRIPTION OF THE INVENTION

Figure 1:
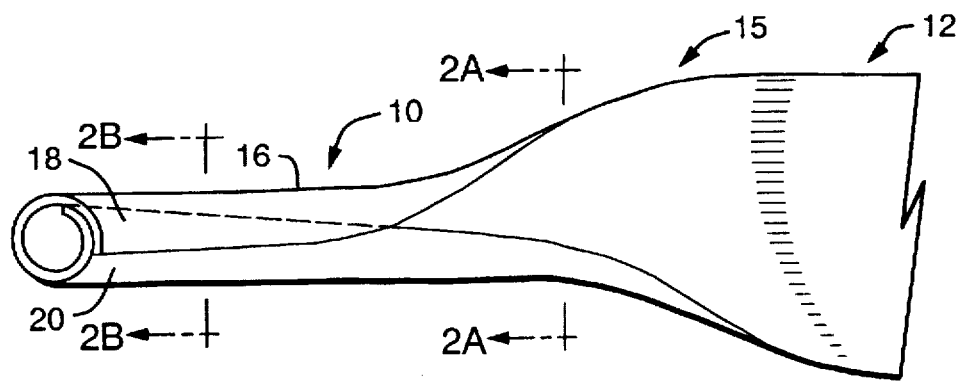
FIG. 1 depicts a partially formed metal alloy strip.

FIG. 1 illustrates the progressive forming of the flux cored brazing composition 10 according to the present invention. The composite comprises a strip 12 of a brazing metal, such as a metal alloy, that is formed into channel 15 about its longitudinal axis. As illustrated, the channel is filled with powdered flux material 14. This extremely fine powder is extremely difficult to handle and especially difficult to introduce into channel 15 in precisely controlled and evenly distributed amounts. The inventor has found this is possible when a volumetric feeder having an auger feeder is utilized. Preferred is the type of volumetric feeder principally used for handling pharmaceutical materials such as made by Acrison, Inc. of Moonachie, N.J. This model features inter-auger action which is the rotation of double concentric augers operating at dissimilar speeds, thereby achieving the filling of channel 15 with powdered flux 14 at uniform density through the length of strip 12. Attempts to fill strip 12 with flux 14 without the use of such equipment is not possible and prevents the preparation of the flux-cored product in continuous lengths of more than 500 feet to 10,000 feet long.

Once filled with flux 14, channel shape 15 is rolled to form a cylinder 16, comprising a sheath of metal alloy strip encircling solid flux material 14. Preferably, the cylinder 16 is formed by an overlapping of lips 18 & 20 of strip 12.

Figure 2A:
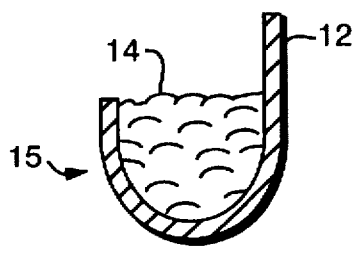
FIG. 2A is a cross-sectional view taken along line 2A—2A of FIG. 1 of a rolled Al—Si strip formed into a substantial channel arrangement and filled with the finely powdered flux.

FIG. 2A depicts a cross-sectional view of the formed channel 15 in which a braze alloy sheath 12 is a repository for a solid flux material 14.

Figure 2B:
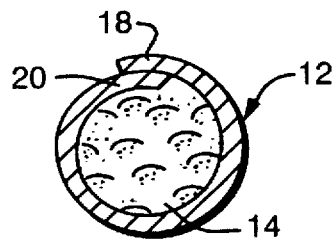
FIG. 2B is a cross-sectional view taken along line 2B—2B of FIG. 1 depicting a circular arrangement and of the flux core.

FIG. 2B depicts a cross sectional view of cylinder 16 in which a brazing alloy sheath 12 encompasses a core of a solid flux material 14. The flux core 14, as shown in FIG. 2B, can be of firmly packed solid flux particulate mixture that effectively resembles a solid mixture. Alternatively, the flux core can be less dense and more loosely packed than the solid mixture of FIG. 2B.

Figure 3:
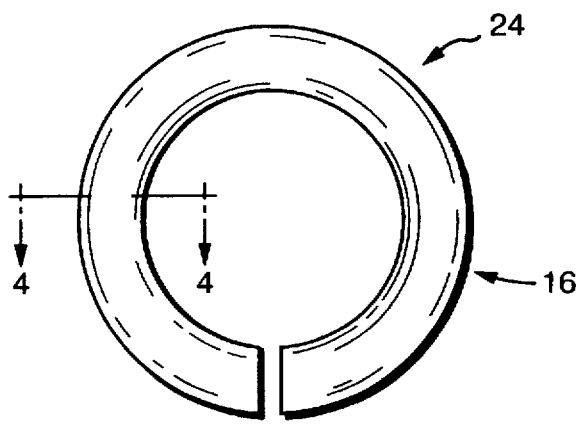
FIG. 3 depicts a braze ring of the flux cored brazing composition according to a preferred embodiment of the invention.
Figure 4:
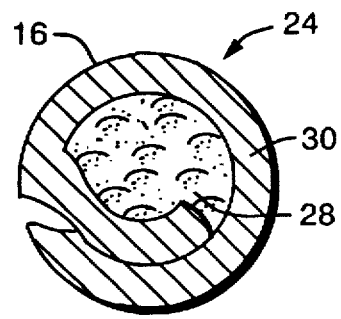
FIG. 4 is a cross-sectional view taken along line 4—4 of FIG. 3.

Cylinders 16 can be formed into a variety of shapes to provide ease of brazing. FIGS. 3 and 4 illustrate a flux cored brazing composition in which cylinder 16 is formed into a braze ring 24 of a circular toroidal shape. As noted above, once the flux-cored brazing material is produced into extremely long lengths, it is economically feasible to reduce that length to various sizes as dictated by industry needs.

As illustrated, the circular flux cored component 24 includes a solid flux core 28 surrounded by a sheet of metal alloy 30. This and similarly shaped flux cored compositions facilitate ease of brazing as the composition can be formed to a number of desired shapes and sizes and easily positioned over a joint or surface to be brazed. The application of heat to the brazing composition causes essentially simultaneous flux application and brazing of the surface as the melting point of the flux and alloy are essentially the same. Thus, a single, manageable composition forming a unitary structure comprising the brazing alloy and flux is easily applied to the surfaces to be brazed. Moreover, each component of the unit has substantially the same melting temperature range.

The metal alloy strip 12 preferably comprises a suitable brazing alloy such as a eutectic mixture of aluminum-silicon. A preferred aluminum-silicon alloy preferably has an aluminum content between 87 and 93% by weight and, most preferably about 88% by weight, and a silicon content between 7 and 13% by weight and, most preferably 12% by weight. Strip 12 can be formed to any desirable thickness as will be appreciated by one having ordinary skill in the art. In a preferred embodiment strip 12 has a thickness between about 0.003 and 0.032 inch, and more preferably between about 0.008 and 0.012 inch, for ease of rolling and subsequent shaping.

Preferably, the aluminum-silicon alloy useful with the invention melts in the range of 577° to 613° C., and most preferably in the range of about 577° to 582°. Generally, the melting range will be about 577° C. to 613° C. where the silicon content of the alloy is 7.5%, about 577° C. to 599° C. where the silicon content of the alloy is 10%, and about 577° C. to 582° C. where the silicon content of the alloy is 12%.

The present invention preferably employs a solid, non-hygroscopic, non-corrosive flux material that is placed into the metal alloy channel 15 via the volumetric feeder discussed above. The flux preferably comprises, in powdered form, a mixture of potassium fluoro aluminate complexes, preferably, potassium tetrafluoroaluminate ($KAl_4$) and potassium hexafluoroaluminate ($K_3IF_6$). Suitable fluxes for use as a flux core once the metal alloy strip 12 is formed into a sheath encasing the flux, can be obtained from Solvay Performance Chemicals Aluminum Corp. under the tradename NOCOLOK.

In one embodiment, it is desirable to incorporate a powdered metal alloy within the potassium fluoro aluminate flux in order to reduce the flux content of the brazing composite. The flux can thus be diluted with a powdered metal alloy, such as a silicon-aluminum alloy having silicon and aluminum contents similar to what is present in the brazing alloy sheath. The powdered metal alloy can be added to the flux at an amount of about 40 to 10% by weight of the flux.

The eutectic aluminum-silicon alloys useful in forming the flux cored brazing composition usually melt at about 577° C. Eutectic mixtures of potassium fluoroaluminates, and specifically combinations of $KAl_4$ and $K_3IF_6$, have a melting temperature in the range of about 562° C. and 577° C., a temperature slightly below the melting point of the brazing alloy. The melting points of both the flux and the brazing alloy are below that of the fraying surfaces. Other non-corrosive flux compositions may be employed provided they are suitable for brazing aluminum, even if the liquidus point thereof is somewhat above, rather than below, the melting point of the brazing alloy, provided the flux becomes reactive below the melting temperatures of the faying surfaces.

In one aspect of the invention, a non-corrosive flux is combined with an Al—Si eutectic alloy in a form that is easy to handle and simple to apply to various surfaces to be brazed. Accordingly, a narrow, elongate sheet or strip of a metal alloy composition 12, preferably Al—Si is formed or bowed about its longitudinal axis to form a channel shaped receptacle for the flux After the flux is deposited, the channel is formed into a cylindrical elongated sheath of metal alloy enclosing the flux. In a preferred embodiment, the ratio of flux to metal alloy by volume is in the range of about 60:40 to 10:90, and preferably, is about 30:70.

The cylindrical, elongate sheath of flux-cored brazing composition can subsequently be formed to a desired shape, such as a circle or oval. The composition can then be placed between or adjacent to the faying surfaces. The entire unitary structure and the faying surfaces are then heated to a suitable brazing temperature sufficient to melt the flux and the glazing alloy and thus join the faying surfaces. The components are then cooled to solidify the brazing alloy to secure the bond between the faying surfaces.

The metal alloy strip 12 may be formed or bowed into any desired shape and size. For example, the strip 12 may be rolled about its longitudinal axis in a substantially circular manner. Once rolled, the preformed sheet may be shaped, twisted or molded into various shapes, usually adopting a configuration complementary to the various angles and sizes of the surfaces to be brazed. As illustrated in FIGS. 3 and 4, the sheath can be formed into braze rings having a circular cross-section, and further having a diameter between 0.032 and 0.125 inches.

In another embodiment, a corrosive and hygroscopic flux particulate may be intimately combined with a moisture repelling vehicle composition, such as polybutene, a wax or acrylic. The flux and vehicle are then ball milled (for about 10 to 30 minutes) with a wetting agent and solvent to make the mixture non-hygroscopic and to keep captive any residual moisture inherent to a corrosive flux. The vehicle also serves to protect the brazing alloy sheath from the corrosive properties of the flux.

Such a formulation generally includes about 2–20% by weight vehicle, about 50–60% by weight flux and the balance solvent. The vehicle, as noted above can be an acrylic, a polybutene or a wax Suitable waxes include long chain fatty acids such as oleic and stearic acid. Suitable solvents are those compatible with the vehicle materials and can include mineral spirits, napthas, and straight chain or aromatic hydrocarbons.

The invention further contemplates a flux cored Al—Si elongate sheath having various cross-sectional shape and size dimensions. The elongate sheath can then be formed into a variety of shapes depending upon the faying surface contours and dimensions. Thus, the braze rings can be manufactured to meet whenever processing demands the user may have.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of preparing a brazing composition comprising the steps of:

providing a narrow, elongate strip of aluminum silicon filler metal alloy having a melting temperature in the range of 577° C. to 613° C.;

forming the strip about its longitudinal axis to form an elongate channel of metal alloy:

depositing into the channel of metal alloy an extremely finely powdered flux material via a volumetric feeder, with the flux material being used in an amount such that the ratio of flux material to metal alloy, by volume, is in the range of about 60:40 to 10:90;

rolling the filled channel about its longitudinal axis to form an elongate sheath of metal alloy enclosing a core of flux material; and forming the sheath into a desired shape.

2. The method of claim 1 wherein the sheath is formed into a circular shape having a desired diameter.

3. The method of claim 2 wherein the sheath has a diameter in the range of about 0.032 to 0.125 inches.

4. The method of claim 1 wherein the metal alloy strip comprises about 93–87 wt. % aluminum and about 7–13 wt. % silicon.

5. The method of claim 1 wherein the strip is about 0.003 to 0.032 inches thick and about 0.30 to 0.70 inches in width and at least 500 feet long when in coil form.

6. The method of claim 1 wherein the powdered flux comprises a eutectic mixture of $K_3AlF_6$, $K_2AlF_5$ and $KAlF_4$ having a melting temperature in the range of about 562° C. to 577° C.

7. The method of claim 1 wherein the powdered flux material comprises a corrosive and hygroscopic flux particulate.

8. The method of claim 1 wherein said flux particulate further comprises a moisture repelling vehicle composition.

9. The method of claim 8 wherein said moisture repelling vehicle composition is selected from the group consisting of polybutene, a wax, and an acrylic.

10. The method of claim 8 further comprising the steps of:

adding a wetting agent and a solvent;

ball milling for at least ten minutes said wetting agent and said solvent with said vehicle composition and with said flux particulate, wherein a non-hygroscopic mixture is obtained and wherein any residual moisture from said corrosive flux particulate is held captive.

11. The method of claim 1 wherein said finely powered flux at least partially comprises a powdered metal alloy.

* * * * *